United States Patent [19]

Zanzotto et al.

[11] Patent Number: 4,904,305
[45] Date of Patent: Feb. 27, 1990

[54] NOVEL ASPHALTIC COMPOSITION

[75] Inventors: Ludo Zanzotto, Calgary; Albert J. Faber, Lloydminster; Dennis P. Foley, Calgary; Royston B. Jeffries, Calgary; R. David Watson, Calgary, all of Canada

[73] Assignee: Nova Husky Research Corporation, Calgary, Canada

[21] Appl. No.: 281,782

[22] Filed: Dec. 9, 1988

[30] Foreign Application Priority Data

Jan. 26, 1988 [CA] Canada .................................. 557339

[51] Int. Cl.$^4$ .............................................. C08L 95/00
[52] U.S. Cl. .................... 106/284; 106/278; 106/279; 106/280; 208/23
[58] Field of Search ............... 106/278, 279, 280, 284; 208/23

[56] References Cited

U.S. PATENT DOCUMENTS

| 3,374,104 | 3/1968 | Baum et al. | 106/284 |
| 3,462,359 | 8/1969 | Fauber | 106/284 |
| 3,664,856 | 5/1972 | Evans et al. | 106/278 |
| 4,139,397 | 2/1979 | Yan | 106/278 |
| 4,207,117 | 6/1980 | Eppenscheld et al. | 106/279 |
| 4,617,062 | 10/1986 | Poirier | 106/284 |
| 4,631,088 | 12/1986 | Poirier | 106/284 |
| 4,683,005 | 7/1987 | Poirier | 106/284 |
| 4,755,277 | 7/1988 | Breuker et al. | 106/278 |

FOREIGN PATENT DOCUMENTS

| 1114765 | 12/1981 | Canada . |
| 1151579 | 8/1983 | Canada . |
| 1221502 | 5/1987 | Canada . |

Primary Examiner—Paul Lieberman
Assistant Examiner—Helene Klemonski
Attorney, Agent, or Firm—Bernard, Rothwell & Brown

[57] ABSTRACT

A novel asphaltic composition consisting of from about 2% to about 10% w/w of a hydrocracking residue which is the distillation residue obtained from a hydrocracking process of heavy crude oil in admixture with from about 98% to about 90% w/w of a conventional asphalt. These asphaltic compositions are especially useful when mixed with mineral aggregate to provide road mixes which lead to improved road construction or road paving.

14 Claims, 8 Drawing Sheets

NOVEL ASPHALTIC COMPOSITION

This invention relates to a novel asphaltic composition, also known to those skilled in the art as a road binder composition, which is useful in road construction when said composition is used in admixture with an appropriate mineral aggregate to form a suitable road mix.

There is a growing interest in the wider utilization of heavy crude oils. With the generally higher demand for lighter petroleum fractions, there is thus an increasing interest in the use of destructive processes in the presence of hydrogen in the processing of heavy crude oils. Such processes are known as hydrocracking processes and a by-product of these processes is a distillation residue which is commonly known as a hydrocracking residue.

It is known from Canadian patent No. 1,221,502, issued May 12, 1987, that attempts have been made in the past to use a hydrocracking residue, referred to in that patent as a petroleum pitch, in admixture with an asphalt to provide a paving grade asphalt composition suitable for road paving purposes. Such an asphalt composition suffers from certain disadvantages in that the hydrocracking residue has been produced by relatively severe hydrocracking operations which provide residual pitches or hydrocracking residues with their composition strongly affected by the hydrocracking process. These pitches are residues from the hydrocracking processes in which there is said to be a pitch conversion of at least 40% and preferably in excess of 80% pitch conversion. These high temperature hydrocracking operations and high conversion rates result in the production of hydrocracking residues which are difficult to mix with asphalt. Moreover, the asphaltic compositions thus produced do not always conform to the required standard or specification for use in road mixes for road paving and it is not easy to produce an acceptable asphaltic composition for sale to customers requiring high quality asphalt for road construction.

We have now found, and herein lies our invention, that when a hydrocracking residue from a heavy crude oil is added in relatively small amounts to a conventional asphalt to provide an asphaltic composition, there is an unexpected and highly desirable result in that the hydrocracking residue acts as an effective anti-stripping agent. Thus, such asphaltic compositions containing a relatively small amount of hydro-cracking residue mixed with asphalt may be used with mineral aggregates to provide road mixes which have dramatically improved anti-stripping properties thus giving improved durability of road construction without the addition of expensive conventional anti-stripping agents.

We have also found, and herein lies a further feature of our invention, that when a heavy crude oil is subjected to a particular hydrocracking process, carried out under controlled, less destructive conditions, namely at lower conversion rates, there is obtained a superior hydrocracking residue. This latter residue can be readily mixed in relatively larger amounts with conventional asphalt to provide asphaltic compositions which have unexpected valuable properties. Even when these relatively larger quantities of said hydrocracking residue are mixed with conventional asphalt, it has been surprisingly found that the asphaltic compositions thus obtained conform to the specifications laid down by provincial authorities as standard requirements for road construction and road paving.

According to our invention, as claimed herein, we provide a novel asphaltic composition for use in road construction consisting of from about 2% to about 10% w/w of a hydrocracking residue and from about 98% to about 90% w/w of asphalt, said hydrocracking residue being the distillation residue obtained from a hydrocracking process of heavy crude oil and said asphalt having a penetration at 25° C. between 20 dmm and 600 dmm. These asphaltic compositions can be mixed with mineral aggregate to provide a road mix which possesses remarkably improved anti-stripping properties thus resulting in greater durability in a road constructed therefrom without the addition of an expensive conventional anti-stripping agent. Preferred asphaltic compositions are those containing from about 4% to about 8% w/w of hydrocracking residue and from about 96% to about 92% w/w of asphalt.

According to a further feature of our invention, as claimed herein, we provide a novel asphalt composition for use in road construction consisting of from about 10% to about 30% w/w of a hydrocracking residue and from about 90% to about 70% w/w of asphalt, said hydrocracking residue being the 520° C.+ distillation residue obtained from the H-Oil TM hydrocracking process (65% conversion) of heavy crude oil and said asphalt having a penetration at 25° C. between 20 dmm and 600 dmm.

Preferred asphaltic compositions are those containing from about 12% to about 25% w/w of hydrocracking residue and from about 88% to about 75% w/w of asphalt. These particular asphaltic compositions are valuable in that, although they contain relatively larger amounts of hydrocracking residue, they are equal in all respects to a normal asphalt or virgin asphalt prepared according to conventional procedures. Thus, the asphaltic compositions containing from about 10% to about 30% w/w, preferably from about 12% to about 25% w/w, of hydrocracking residue with from about 90% to about 70% w/w, preferably from about 88% to about 75% w/w, of asphalt appear to function in all respects as if they were wholly asphalt (100%) in that they can be mixed with mineral aggregate to provide highly satisfactory and acceptable road mixes conforming to specifications laid down by authorities controlling the quality of road construction.

The heavy crude oil used as starting material may be a heavy crude oil originating from western Canadian sources, particularly such oil from Alberta.

The asphalt used in admixture with the hydrocracking residue to provide the asphaltic composition is a conventional asphalt in that it may be asphalt produced either by vacuum distillation of a crude oil, or by oxidation of the residue resulting from the vacuum distillation of a crude oil, or by deasphalting of a petroleum fraction, for example by propane deasphalting or butane deasphalting. A preferred asphalt is one having a penetration at 25° C. between 60 dmm and 400 dmm (measured according to ASTM Standard D5 "Penetration of Bituminous Material").

A particularly valuable aspect of the invention is the use of heavy crude oil from western Canada, especially from Alberta, which has been subjected to the hydrocracking process known as the "H-Oil TM" hydrocracking process to provide a highly desirable hydrocracking residue which can then be mixed with an asphalt having a penetration at 25° C. between 20 dmm and 600 dmm, and more specifically a penetration at 25° C. between 60 dmm and 400 dmm. The asphaltic compositions produced by such admixture are valuable commercial products for use in road mixes for road construction and paving.

Asphaltic materials, to be used in road construction, must have specific properties to provide good quality, durable pavements. To ensure that inferior asphaltic materials are not used, Government agencies have developed certain qualitative criteria, which are included in pertinent specifications or standards for such materials.

In Canada, requirements for paving grade asphalts are included in different provincial specifications. These provincial specifications are relatively stringent and in this invention, whenever possible, the properties of our asphaltic compositions will be compared with the specifications for the paving grade asphalts of Alberta Transportation, Manitoba Department of Highways and Saskatchewan Highways and Transportation.

The hydrocracking residue used in this invention may be obtained by hydrocracking of Alberta heavy crude oil using the H-Oil TM hydrocracking process (65% conversion). The H-Oil TM hydrocracking residue is the 520° C.+ residue resulting from the distillation process after such hydrocracking.

The H-Oil TM unit is a heavy oil hydrocracker which uses catalyst. It includes one or two ebullated bed reactors in series and, often two or more reactor trains in parallel. These are followed by a vapour liquid separation section and a liquid products fractionator. The unit is used to achieve a 65% conversion of the 520° C.+ fraction of the feed. This is achieved by recycling vacuum bottoms from the fractionation section back to the reactor feed and installation of the required reactor capacity. The catalyst in the reactor is maintained in a suspended state by the upflow feed and the ebullating pump.

The atmospheric bottoms from the Crude Unit is blended with H-Oil TM vacuum column bottoms recycle and fed to the bottom of the reactor. The liquid feed is mixed with recycle and make-up hydrogen after each has been preheated in separate fired heaters. The reactor products and excess hydrogen are separated in a gas cooling and separation system. Part of the hydrogen rich gas is recycled directly to the reactor. The inerts level is controlled by purifying part of the recycle gas. Part of the recycle gas stream plus letdown flash gas is routed through an amine absorber.

The liquid products from the gas-liquid separation section are fractioned in an atmospheric column and a vacuum column. The 190° C. minus overhead from the atmospheric column goes to a gas plant where a $C_4$- 190 naphtha stream and a fuel gas stream are produced. The naphtha goes to a Naphtha Hydrotreater for further upgrading. The 190°-343° C. and 343°-521° C.+ material recovered in the atmospheric and vacuum columns is sent to the Diesel and Gas Oil Hydrotreaters for further upgrading. The vacuum column bottom stream is divided into the reactor recycle and the net 520° C.+ product stream. This net 520° C.+ vacuum residue (very heavy, viscous material) is the hydrocracking residue referred to in the following description.

In the paragraphs following hereafter some data on the chemical composition of this H-Oil TM hydrocracking residue are given and compared with paving grade asphalts obtained by vacuum distillation of the Alberta heavy crude oil, mainly with asphalt 85/100 Pen, because such asphalt has a consistency which is closest to the consistency of the H-Oil TM hydrocracking residue.

Figure 1:
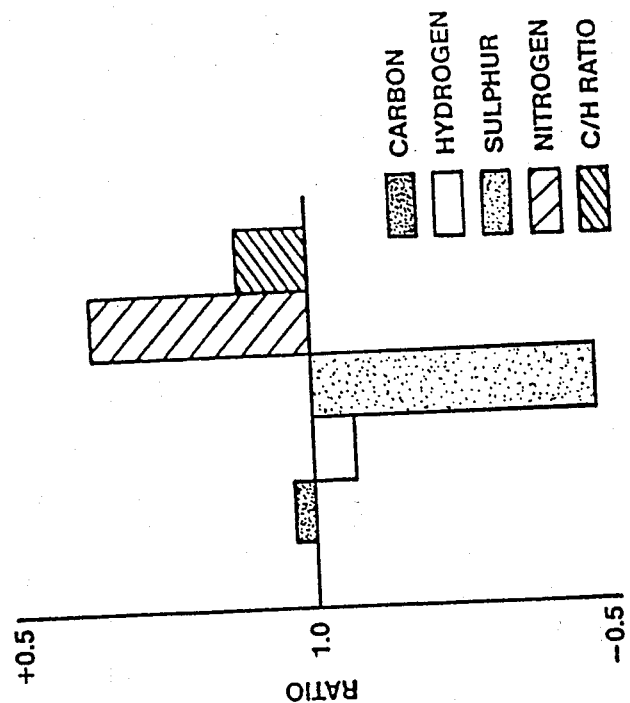
FIG. 1 shows the elemental analysis and C/H ratio of H-Oil TM process residue relative to asphalt 85/100 Pen.

Elemental Analysis:

The comparison of elemental analysis of the H-Oil TM hydrocracking residue and asphalt 85/100 Pen is shown in FIG. 1. H-Oil TM hydrocracking residue has a higher C/H ratio, a lower sulphur content and a higher nitrogen content than asphalt 85/100 Pen.

Group Analysis by Column Liquid Chromatography (according to ASTM Standard D4124 "Separation of Asphalt into Four Fractions"):

This analysis gives practically identical results for H-Oil TM hydrocracking residue and for asphalt 85/100 Pen. The method was used to fractionate both materials for further analyses.

Heavy Metals Content:

H-Oil TM hydrocracking residue contains substantially lower amounts of vanadium and nickel than asphalt 85/100 Pen produced from the same heavy crude oil as can be seen in Table 1 on page 14.

Acid Number (according to ASTM Standard D664-81 "Neutralization Number by Potentiometric Titration":

The acid numbers of the H-Oil TM hydrocracking residue and asphalts 85/100 Pen and 150/200 Pen are shown in Table 2 on page 15. When comparing these numbers, it is evident that the acidity present in asphalts practically disappears in the H-Oil TM hydrocracking residue.

Figure 2:
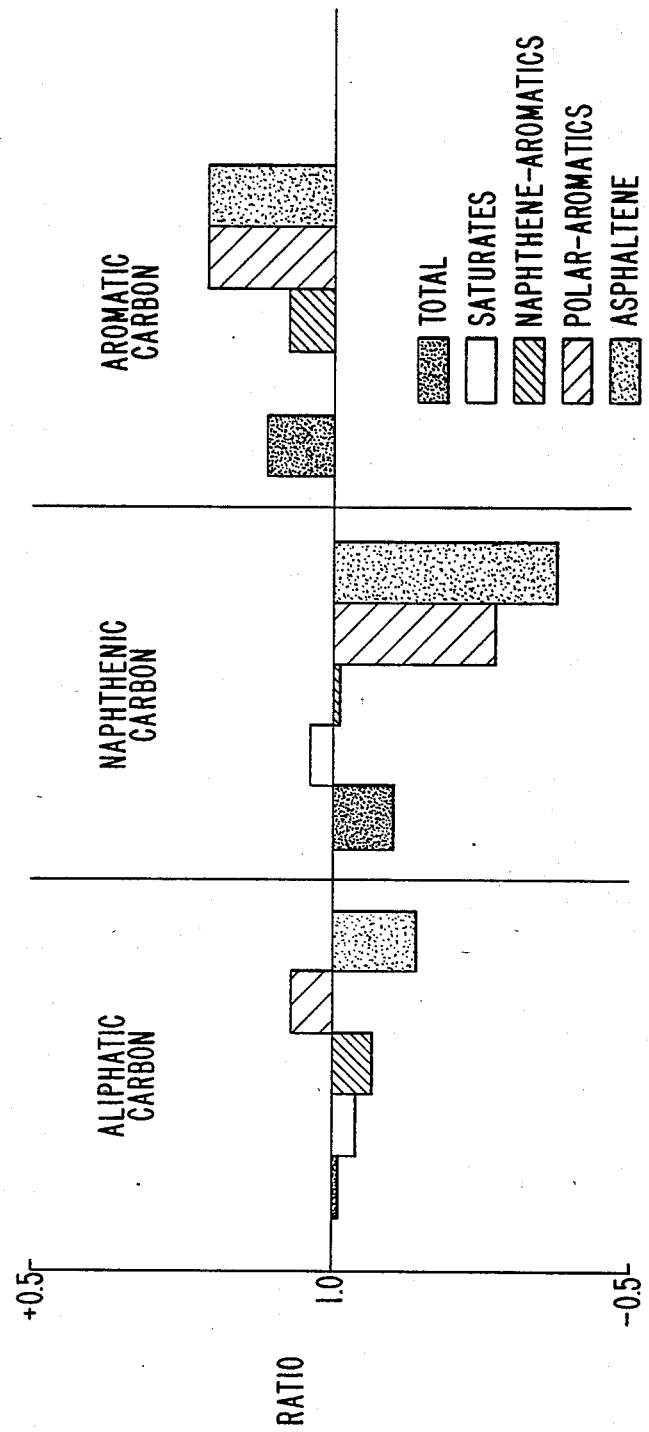
FIG. 2 shows the aliphatic, naphthenic and aromatic carbon content of H-Oil TM process residue relative to asphalt 85/100 Pen.

Carbon-13 Nuclear Magnetic Resonance Spectrometry:

This test, conducted on the H-Oil TM hydrocracking residue, asphalt 85/100 Pen and their fractions, obtained by liquid chromatography (ASTM D4124) produced results as shown in FIG. 2. These results point to the increased amount of aromatic carbon at the cost of naphthenic carbon mainly in heavy fractions of H-Oil TM hydrocarbon residue.

Figure 3:
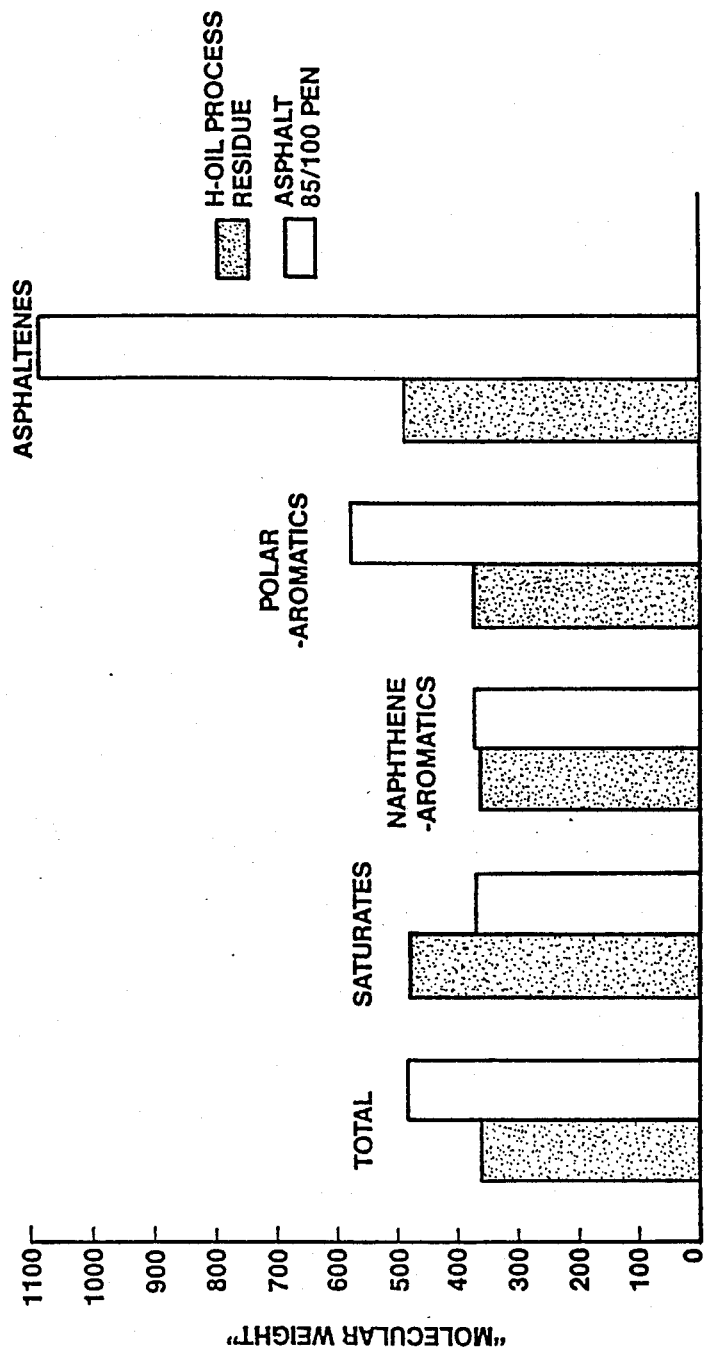
FIG. 3 shows the average "molecular weight" of H-Oil TM process residue and asphalt 85/100 Pen by gel permeation chromatography (GPC).

Molecular Weights:

Molecular weights (MW) and their distribution for the H-Oil TM hydrocracking residue and asphalts, measured by vapour pressure osmometry (VPO) and by gel permeation chromatography (GPC) are given in Table 3 on page 16 and in FIG. 3.

According to the VPO results, the MW of maltenes (obtained by n-heptane precipitation) from the H-Oil TM hydrocracking residue, and from asphalts 85/100 Pen and 150/200 Pen, are similar. On the other hand, the MW of asphaltenes from the H-Oil TM hydrocracking residue are dramatically lower than the MW of asphaltenes from these same two asphalts.

The results from GPC demonstrate that the lighter H-Oil TM hydrocracking residue fractions, contained in "saturates" and "naphthene aromatics" are similar by their "molecular weights" to those fractions in asphalt 85/100 Pen. The "polar aromatics" and "asphaltenes" fractions from the H-Oil TM hydrocracking residue have an average "molecular weight" considerably lower than the respective fractions from asphalt 85/100 Pen.

Figure 4:
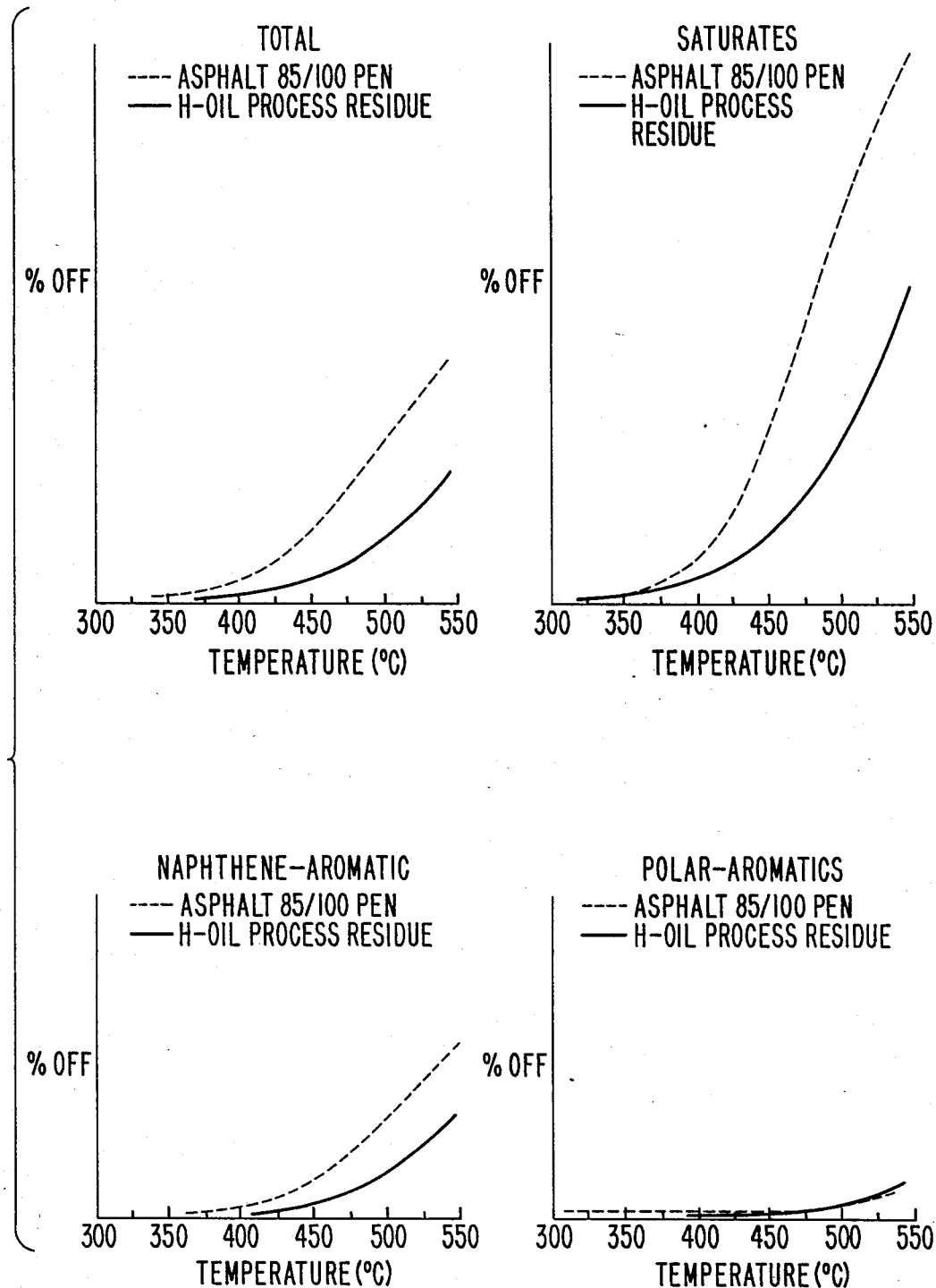
FIG. 4 shows gas chromatography (GC) simulated distillation of H-Oil TM process residue, asphalt 85/100 Pen and their fractions.

Gas Chromatography Simulated Distillation:

The results of this test are summarized in FIG. 4. It can be seen that the H-Oil TM hydrocracking residue contains less lower boiling parts than asphalt 85/100 Pen. In keeping with these results, there is a corresponding higher flash point (ASTM Standard D92 "Flash and Fire Points by Cleveland Open Cup") for the H-Oil TM hydrocracking residue compared with asphalt 85/100 Pen from the same Alberta heavy crude oil. (Table 4 on page 17).

Solubility of H-Oil TM Hydrocracking Residue in Different Solvents:

Results of this test, shown in Table 4, indicate that the heptane/xylene equivalent of asphalt oscillates around 20 whereas for H-Oil TM hydrocracking residue, it increases to 53. This means that the asphaltenes from the H-Oil TM hydrocracking residue may need higher aromaticity of its surrounds to prevent their precipitation.

Comparing the results of the analyses of asphalt 85/100 Pen and H-Oil TM hydrocracking residue, it can be concluded that their lighter parts, contained in "saturates" and "naphthene aromatics" fractions, are rather similar except for the lower content of the lightest parts in the case of H-Oil TM hydrocracking residue. Conversely, the differences in their heavier parts contained in "polar aromatics" and "asphaltenes" fractions are significant. The heaviest parts of the H-Oil TM hydrocracking residue provide components with lower molecular weight, highly condensed, with strong aromatic character and with small volume of molecules. The H-Oil TM hydrocracking residue has a lower content of heavy metals and sulphur and a higher content of nitrogen.

The above mentioned differences between H-Oil TM hydrocracking residue and distillation asphalts, both from Alberta heavy crude oils, are the consequence of the processes occurring during hydrocracking. In hydrocracking, besides the main reaction of cracking and hydrogenation, there is also demetallization, desulphurization and, in the case of heavy parts, to some extent, dealkylation and aromatization are taking place.

Physico - Chemical Parameters and Aging Properties of H-Oil TM Hydrocracking Residue:

Conventional parameters and viscosity at different temperatures of the H-Oil TM hydrocracking residue and three different road grade asphalts (85/100 Pen, 150/200 Pen and 200/300 Pen) are given in Tables 4 and 5 on pages 17 and 18. The aging characteristics of the H-Oil TM hydrocracking residue and the same road grade asphalts, measured by Thin Film Oven Test (ASTM D1754) are given in Table 6 on page 19. The aging characteristics of the H-Oil TM hydrocracking residue compared with asphalt 150/200 Pen measured by "Microfilm Durability Test" (R. L. Griffin, T. K. Miles, C. J. Penther, Proc. AAPT, Vol. 24, 1955) are summarized in Table 7 on page 20. It can be seen that the H-Oil TM hydrocracking residue is a material with a higher temperature susceptibility and lower durability compared with road asphalts, prepared from Alberta heavy crude oil by vacuum distillation. This means that the roads constructed by using H-Oil TM hydrocracking residue per se would be more prone to cracking in winter, plastic deformations during the warm summer period and, in general, their performance would be worse and their service life shorter than those roads constructed from asphalt. Also, H-Oil TM hydrocracking residue per se would not meet the Alberta, Manitoba and Saskatchewan provincial specifications for paving grade asphalts.

Compositions of Hydrocracking Residue with Asphalts:

Because H-Oil TM hydrocracking residue by itself cannot be used successfully as a road binder, it was combined with different grades of paving asphalts to find if the resulting asphaltic compositions might be utilized in road construction. First, compositions with 10%, 20% and 30% of H-Oil TM hydrocracking residue were prepared with asphalt 85/100 Pen, 150/200 Pen and 200/300 Pen. Later, compositions with combinations of these asphalts and H-Oil TM hydrocracking residue were prepared in such a way that their consistency is on the level of the consistency of asphalt 150/200 Pen which is the most widely used asphalt in the Canadian prairie provinces.

Asphaltic compositions were prepared by blending paving grade asphalts with the H-Oil TM hydrocracking residue as follows:

EXAMPLE 1

Preparation of the Asphaltic Composition Containing 5% of Hydrocracking Residue Distillation asphalt 150/200 Pen grade was heated to a temperature of 160° C. and the proper amount (95 parts by weight) was transferred to the vessel equipped with a paddle mixer. The temperature of asphalt in the vessel was maintained at 160° C. The necessary amount (5 parts by weight) of H-Oil TM hydrocracking residue was heated to 160° C. and transferred to the vessel with asphalt 150/200 Pen. Both materials were mixed together with the paddle mixer for one hour and the temperature was maintained at 160° C. After that period, the asphaltic composition containing 5% w/w of hydrocracking residue was ready for use.

EXAMPLE 2

The above Example 1 is repeated using 97 parts by weight of asphalt and 3 parts by weight of hydrocracking residue. There is thus prepared an asphaltic composition containing 3% w/w of hydrocracking residue which is ready for use.

EXAMPLE 3

The above Example 1 is repeated using 92 parts by weight of asphalt and 8 parts by weight of hydrocracking residue. There is thus prepared an asphaltic composition containing 8% w/w of hydrocracking residue which is ready for use.

EXAMPLE 4

The above Example 1 is repeated using 90 parts by weight of asphalt and 10 parts by weight of hydrocracking residue. There is thus prepared an asphaltic composition containing 10% w/w of hydrocracking residue which is ready for use.

The compatibility of asphalts and the H-Oil TM hydrocracking residue was measured by the following test.

Compatibility Test:

The asphaltic composition was poured into a glass cylinder (2340×30 mm i.d.). The cylinder was sealed and placed in an oven at 160° C. for 72 hours. After this time, the cylinder was cooled and cut in half. Material from the top and bottom halves was tested. The tests used were viscosity at 60° C., infrared spectroscopy in the range of 200 to 600 cm$^{-1}$ and the measurement of the acid number. It was found that there is no separation of the H-Oil TM hydrocracking residue and asphalt after these two were blended together to form an asphaltic composition.

Figure 5:
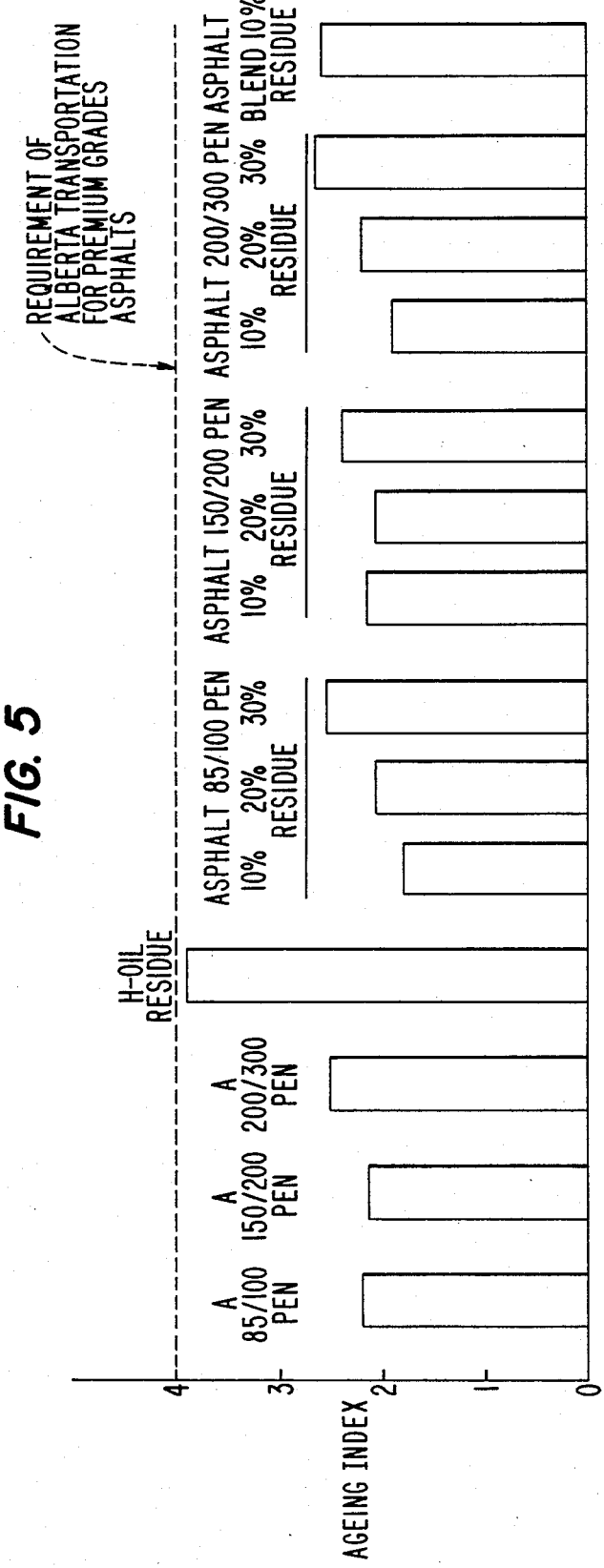
FIG. 5 shows the aging index of tested materials after measurement by the Thin Film Oven Test (TFOT).
Figure 6:
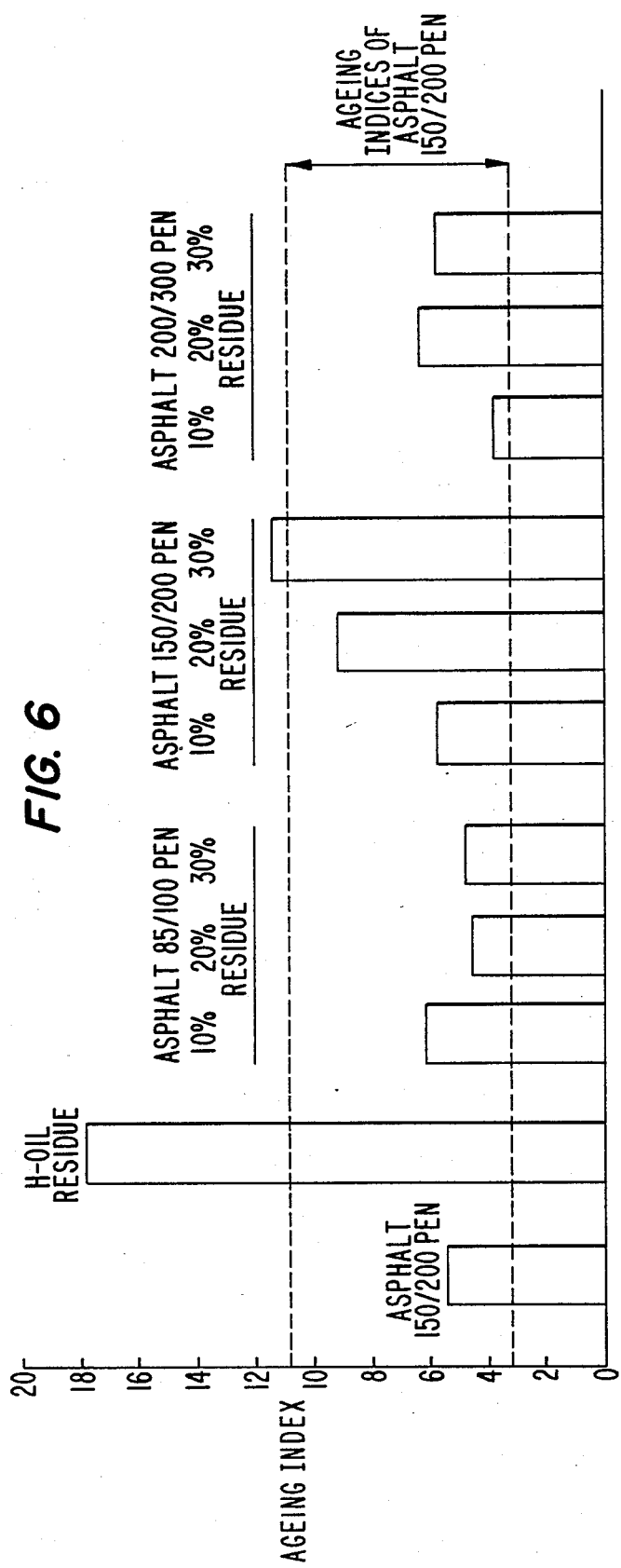
FIG. 6 shows the aging index of materials tested by the Microfilm Durability Test.

The properties of these compositions were evaluated and, when possible, were compared with the specifications of the prairie provinces of Canada. Results of the tests performed on the H-Oil TM hydrocracking residue/asphalt compositions are given in Tables 4, 5, 6 and 7. The results show that properties of these compositions are substantially better than the properties of the H-Oil TM hydrocracking residue per se and are similar to the properties of asphalts. This is true for the consistency/temperature susceptibility as well as for the aging properties. (FIGS. 5 and 6). When the properties of these asphaltic compositions, prepared to have the consistency of asphalt 150/200 Pen, were compared with the Alberta, Saskatchewan and Manitoba specifications, it was found that compositions with the H-Oil TM residue content up to 30% can fulfill the requirements of the Saskatchewan Highways and Transportation specification and compositions with H-Oil TM hydrocracking residue content up to 20% can fulfill the requirements of Alberta Transportation and Manitoba Department of Highways specifications.

Road Mixes with H-Oil TM Hydrocracking Residue/Asphalt Compositions:

Compositions of H-Oil TM hydrocracking residue and asphalt were tested in combination with mineral aggregates in road mixes by Marshall Stability Test (ASTM D1550 "Resistance to Plastic Flow of Bituminous Mixtures Using Marshall Apparatus"). Three compositions with the H-Oil TM hydrocracking residue content of 10%, 20% and 30% and the consistency on the level of consistency as asphalt 150/200 Pen were selected. Also, compositions with the content of H-Oil TM hydrocracking residue 3% and 7% were prepared and tested. Data on the tested compositions are in Table 8 on page 21.

Marshall test was performed on the original samples and on the samples soaked with water for 24 hours to determine the anti-stripping properties of compositions. The results were compared with the results obtained by using asphalt 150/200 Pen.

Figure 7:
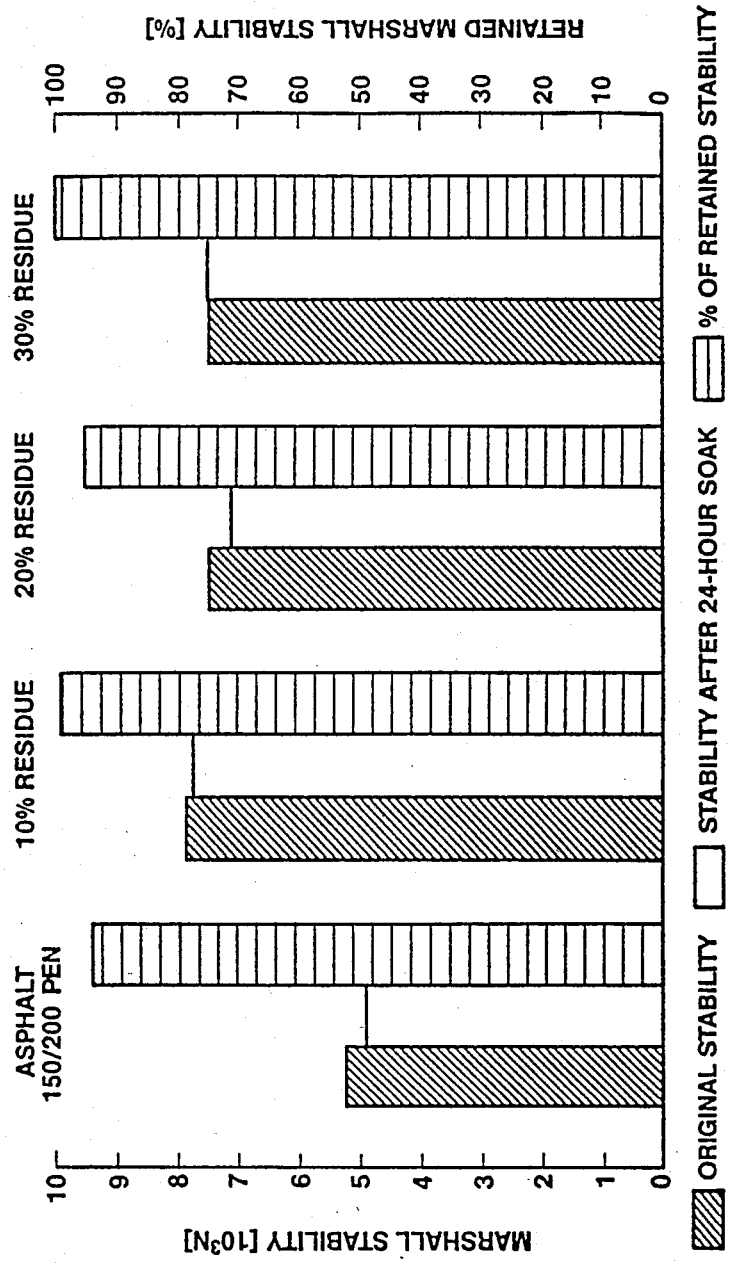
FIG. 7 shows the Marshall stability of mixes with H-Oil TM residue/asphalt blends with southern Alberta aggregate.

In the first set of tests, mixes with relatively fine aggregate gradation using southern Alberta mineral aggregates were prepared. According to typical composition of mineral aggregates from the given area, mineral aggregates contained approximately 36% limestone, 20% quartz, 16% sandstone, 11% shert and 9% quartzite. The aggregate gradation and test results are given in Tables 9 and 10 on pages 22 and 23 and in FIG. 7. In this set of tests, the stabilities of the mixes with blends containing H-Oil TM hydrocracking residue were always 40% to 50% higher than the stability of the reference mix, containing asphalt 150/200 Pen. It was not possible to distinguish between retained stabilities after the samples were soaked in water because all of them, including the mix with the asphalt 150/200 Pen, were close to 100%.

Figure 8:
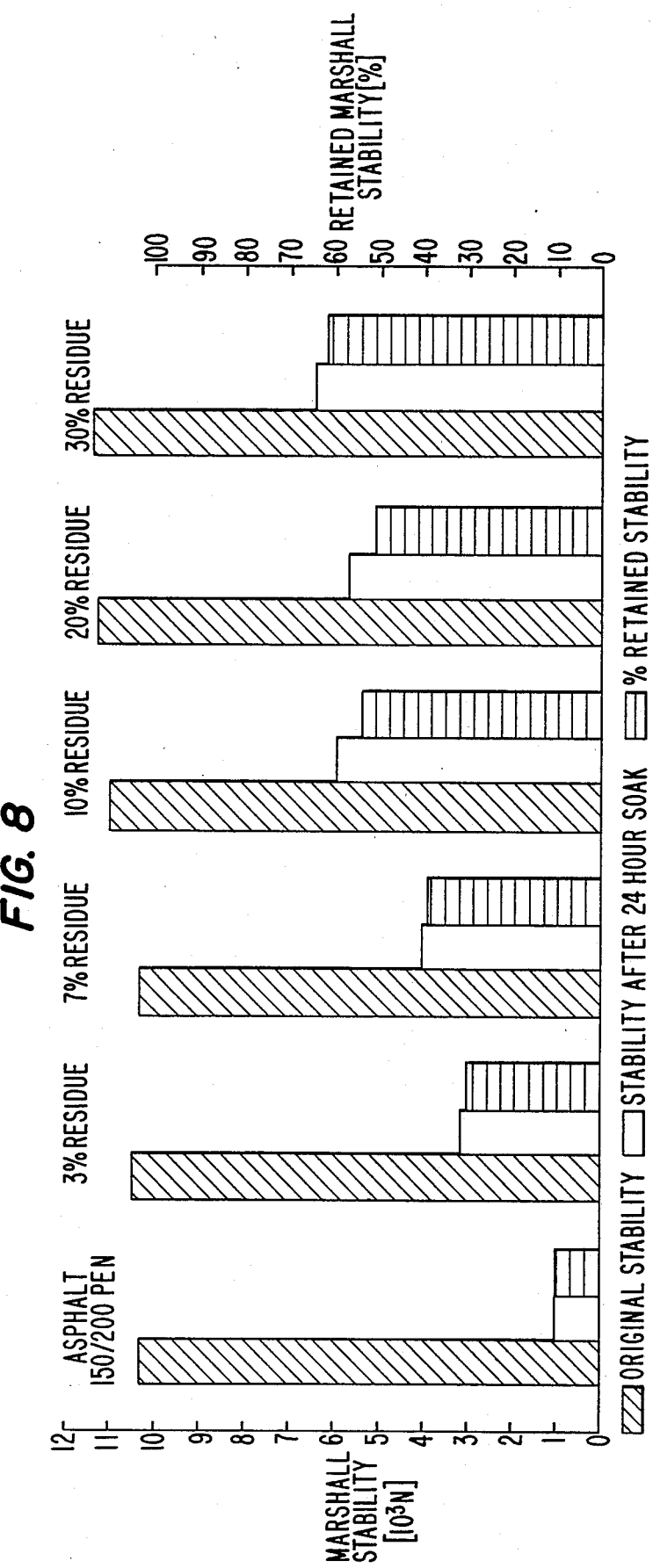
FIG. 8 shows the Marshall stability of mixes with H-Oil TM residue/asphalt blends with Georgia granitic gneiss aggregate.

Another set of tests was carried out using granitic gneiss aggregate from Georgia, U.S.A. This aggregate is used in tests for water damage because it exhibits a wide range of responses when combined with various asphalts and anti-stripping agents. Aggregate gradation and test results are summarized in Tables 11 and 12 on pages 24 and 25 and in FIG. 8. In this case, the original stability of all tested materials was on the same level. The retained stability of the samples after a 24-hour soak in water increased with the increasing amount of hydrocracking residue in the blend. As can be seen in Table 8 and FIG. 12, even a very small proportion of the H-Oil TM hydrocracking residue substantially increases the retained stability of the asphaltic mix, whilst the amount of asphalt 150/200 Pen in mix had to be increased from 5.8% to 6% to obtain any stability after the soak at all. The stability of mix containing 5.8% asphalt 150/200 Pen after the soak in water was zero.

TABLE 1

| CONTENT OF HEAVY METALS IN TESTED MATERIALS | | |
|---|---|---|
| | ASPHALT 150/200 PEN | H-OIL PROCESS RESIDUE |
| V [ppm] | 220 | 129 |
| Ni [ppm] | 104 | 61 |

TABLE 2

| ACID NUMBER OF TESTED MATERIALS | | | |
|---|---|---|---|
| | ASPHALT 85/100 PEN | ASPHALT 150/200 PEN | H-OIL PROCESS RESIDUE |
| ACID NUMBER [mgKOH/g SAMPLE] | 0.82 | 0.80 | 0.07 |

TABLE 3
AVERAGE MOLECULAR WEIGHTS OF ASPHALTENES AND MALTENES OBTAINED FROM TESTED MATERIALS BY PRECIPITATION IN N—HEPTANE

| | ASPHALT 85/100 PEN | ASPHALT 150/200 PEN | H-OIL PROCESS RESIDUE |
|---|---|---|---|
| AVERAGE MOLECULAR WEIGHT OF ASPHALTENES | 11915 | 8382 | 2842 |
| AVERAGE MOLECULAR WEIGHT OF MALTENES | 714 | 652 | 632 |

TABLE 4

CONVENTIONAL VALUES, HEPTANE/XYLENE EQUIVALENT AND SOLUBILITIES OF TESTED MATERIALS

| | ASPHALT 85/100 | ASPHALT 150/200 | ASPHALT 200/300 | H-OIL RESIDUE | ASPHALT 85/100 RESIDUE | | | ASPHALT 150/200 RESIDUE | | | ASPHALT 200/300 RESIDUE | | | 45% A 150/200 45% A 200/300 10% RESIDUE | 22.5% A 150/200 67.5% A 200/300 10% RESIDUE |
|---|---|---|---|---|---|---|---|---|---|---|---|---|---|---|---|
| | | | | | 10% | 20% | 30% | 10% | 20% | 30% | 10% | 20% | 30% | | |
| PENETRATION AT (100 g, 5 s) | | | | | | | | | | | | | | | |
| 25° C. [$10^{-1}$ mm] | 99 | 156 | 248 | 84 | 92 | 87 | 84 | 140 | 138 | 133 | 213 | 186 | 168 | 135 | 186 |
| 15° C. [$10^{-1}$ mm] | 34 | 55 | 85 | 26 | 31 | 32 | 29 | 48 | 47 | 44 | 70 | 61 | 54 | 48 | 62 |
| 5° C. [$10^{-1}$ mm] | 12 | 18 | 29 | 8 | 10 | 12 | 10 | 16 | 16 | 15 | 22 | 21 | 18 | 18 | 21 |
| PENETRATION INDEX | −0.90 | −1.03 | −1.09 | −1.56 | −1.20 | −0.50 | −0.94 | −1.06 | −1.02 | −1.10 | −1.34 | −1.09 | −1.24 | −0.59 | −1.09 |
| PENETRATION AT 0° C. (200 g, 60 s) [$10^{-1}$ mm] | 24 | — | 55 | 18 | 23 | 22 | 26 | 35 | 34 | 32 | 48 | 45 | 37 | 35 | 40 |
| SOFTENING POINT R&B [°C.] | 45.3 | 40.3 | 36.6 | 45.3 | 47.0 | 46.0 | 45.0 | 41.0 | 41.0 | 41.0 | 37.0 | 39.0 | 39.0 | 42.7 | 37.8 |
| DUCTILITY AT 25° C. [cm] | 150+ | 150+ | 105 | 150+ | — | — | — | — | — | — | — | — | — | — | — |
| FLASH POINT [°C.] | 272 | 278 | 245 | 314 | — | — | — | — | — | — | — | — | — | — | — |
| HEPTANE/XYLENE EQUIVALENT | 24 | 20 | 12 | 53 | 26 | 28 | 30 | 23 | 25 | 29 | 30 | 29 | 30 | — | — |
| TRICHLOROETHYLENE SOLUBLE [% wt] | — | — | — | 99.9 | — | — | — | — | — | — | — | — | — | — | — |
| TETRACHLOROMETHANE SOLUBLE [% wt] | — | — | — | 99.9 | — | — | — | — | — | — | — | — | — | — | — |
| TOLUENE SOLUBLE [% wt] | — | — | — | 99.9 | — | — | — | — | — | — | — | — | — | — | — |

TABLE 5

DYNAMIC VISCOSITY OF TESTED MATERIALS AT 25° C. AND 60° C. AND KINEMATIC VISCOSITY AT 135° C.

| | ASPHALT 85/100 | ASPHALT 150/200 | ASPHALT 200/300 | H-OIL RESIDUE |
|---|---|---|---|---|
| DYNAMIC VISCOSITY AT 25° C. $D = 5 \times 10^{-2} s^{-1}$ [mPa.s] | $9.00 \times 10^7$ | $3.81 \times 10^7$ | $1.90 \times 10^7$ | $1.08 \times 10^8$ |
| DYNAMIC VISCOSITY AT 60° C. [mPa.s] | $2.09 \times 10^5$ | $1.35 \times 10^5$ | $7.45 \times 10^4$ | $1.28 \times 10^5$ |
| VISCOSITY RATIO DYN VISC. AT 25° C. / DYN VISC. AT 60° C. | $4.31 \times 10^2$ | $2.82 \times 10^2$ | $2.55 \times 10^2$ | $8.44 \times 10^2$ |
| KINEMATIC VISCOSITY AT 135° C. [mm$^2$s$^{-1}$] | $3.45 \times 10^2$ | $2.79 \times 10^2$ | $2.19 \times 10^2$ | $2.62 \times 10^2$ |

| | ASPHALT 85/100 | | | ASPHALT 150/200 | | ASPHALT 200/300 | | |
|---|---|---|---|---|---|---|---|---|
| | 10% RESID. | 20% RESID. | 30% RESID. | 10% RESID. | 30% RESID. | 10% RESID. | 20% RESID. | 30% RESID. |
| DYNAMIC VISCOSITY AT 25° C. $D = 5 \times 10^{-2} s^{-1}$ [mPa.s] | $4.81 \times 10^7$ | $4.85 \times 10^7$ | | $1.59 \times 10^5$ | $4.85 \times 10^7$ | $1.69 \times 10^7$ | $2.27 \times 10^7$ | $2.60 \times 10^7$ |
| DYNAMIC VISCOSITY AT 60° C. [mPa.s] | $1.59 \times 10^5$ | $1.49 \times 10^5$ | $1.49 \times 10^5$ | $1.49 \times 10^5$ | $1.49 \times 10^5$ | $8.06 \times 10^4$ | $8.98 \times 10^4$ | $8.64 \times 10^4$ |
| VISCOSITY RATIO DYN VISC. AT 25° C. / DYN VISC. AT 60° C. | $3.02 \times 10^2$ | $3.26 \times 10^2$ | $3.26 \times 10^2$ | | | $2.10 \times 10^2$ | $2.53 \times 10^2$ | $3.01 \times 10^2$ |
| KINEMATIC VISCOSITY AT 135° C. [mm$^2$s$^{-1}$] | $2.97 \times 10^2$ | $2.50 \times 10^2$ | $2.50 \times 10^2$ | | | $2.00 \times 10^2$ | $2.17 \times 10^2$ | $2.02 \times 10^2$ |

| | ASPHALT 85/100 | | |
|---|---|---|---|
| | 45% A 150/200 / 45% A 200/300 / 10% RESIDUE | 22.5% A 150/200 / 67.5% A 200/300 / 10% RESIDUE | |
| | 10% RESID. | 20% RESID. | 30% RESID. |
| DYNAMIC VISCOSITY AT 25° C. $D = 5 \times 10^{-2} s^{-1}$ [mPa.s] | $1.16 \times 10^8$ | $1.13 \times 10^8$ | $1.09 \times 10^8$ |
| (row 2) | $2.85 \times 10^5$ / $5.71 \times 10^7$ | $2.62 \times 10^5$ / $3.79 \times 10^7$ | $2.30 \times 10^5$ |
| (row 3) | $4.07 \times 10^2$ / $1.38 \times 10^5$ | $4.31 \times 10^2$ / $9.29 \times 10^4$ | $4.74 \times 10^2$ |
| (row 4) | $3.83 \times 10^2$ / $4.14 \times 10^2$ | $3.51 \times 10^2$ / $4.08 \times 10^2$ | $3.40 \times 10^2$ |
| (row 5) | | | $2.19 \times 10^2$ |

TABLE 6
PARAMETERS OF TESTED MATERIALS
AFTER THEIR AGEING BY TFOT (ASTM D1754)

| | ASPHALT 85/100 | ASPHALT 150/200 | ASPHALT 200/300 | H-OIL RESIDUE | ASPHALT 85/100 | | |
| --- | --- | --- | --- | --- | --- | --- | --- |
| | | | | | 10% RESID. | 20% RESID. | 30% RESID. |
| CHANGE IN MASS [% wt] | | 0.21 | 0.33 | 0.05 | 0.01 | 0.02 | 0.02 |
| PENETRATION OF RESIDUE AT 25° C. [10⁻¹ mm] | 68 | 92 | 140 | 46 | 63 | 60 | 59 |
| PERCENTAGE OF RETAINED PENETRATION | 68.7 | 59.0 | 56.5 | 54.7 | 68.5 | 69.0 | 70.2 |
| SOFTENING POINT R&B OF RESIDUE [°C.] | 50.0 | 47.0 | 40.7 | 50.8 | 49.8 | 50.2 | 49.9 |
| DYNAMIC VISCOSITY OF RESIDUE AT 60° C. [mPa.s] | $4.63 \times 10^5$ | $2.94 \times 10^5$ | $1.70 \times 10^5$ | $4.98 \times 10^5$ | $5.16 \times 10^5$ | $5.46 \times 10^5$ | $5.84 \times 10^5$ |
| AGEING INDEX VISC. AT 60° C. AFTER AGEING / VISC. AT 60° C. BEFORE AGEING | 2.22 | 2.17 | 2.28 | 3.89 | 1.81 | 2.08 | 2.54 |

| | ASPHALT 150/200 | | ASPHALT 200/300 | | 45% A 150/200 45% A 200/300 10% RESIDUE | 22.5% A 150/200 67.5% A 200/300 10% RESIDUE |
| --- | --- | --- | --- | --- | --- | --- |
| | 10% RESID. | 20% RESID. | 30% RESID. | 10% RESID. | 20% RESID. | 30% RESID. | | |
| CHANGE IN MASS [% wt] | 0.17 | 0.16 | 0.10 | 0.16 | 0.20 | 0.15 | — | 0.28 |
| PENETRATION OF RESIDUE AT 25° C. [10⁻¹ mm] | 83 | 86 | 77 | 136 | 101 | 90 | — | 104 |
| PERCENTAGE OF RETAINED PENETRATION | 59.3 | 62.3 | 57.9 | 63.8 | 54.3 | 53.6 | — | 55.9 |
| SOFTENING POINT R&B OF RESIDUE [°C.] | 47.9 | 46.3 | 46.4 | 41.5 | 45.2 | 46.0 | — | 44.6 |
| DYNAMIC VISCOSITY OF RESIDUE AT 60° C. [mPa.s] | $3.40 \times 10^5$ | $3.08 \times 10^5$ | $3.57 \times 10^5$ | $1.53 \times 10^5$ | $1.97 \times 10^5$ | $2.29 \times 10^5$ | — | $2.42 \times 10^5$ |
| AGEING INDEX VISC. AT 60° C. AFTER AGEING / VISC. AT 60° C. BEFORE AGEING | 2.14 | 2.07 | 2.40 | 1.90 | 2.19 | 2.65 | | 2.60 |

TABLE 7
PARAMETERS OF TESTED MATERIALS AFTER THEIR AGEING BY THE "MICROFILM DURABILITY TEST"

| | VISCOSITY AT 25° C. $D = 5 \times 10^{-2} s^{-1}$ BEFORE AGEING [mPa.s] | VISCOSITY AT 25° C. $D = 5 \times 10^{-2} s^{-1}$ AFTER AGEING [mPa.s] | AGEING INDEX |
|---|---|---|---|
| ASPHALT 150/200 PEN | $8.70 \times 10^6$ | $4.74 \times 10^7$ | 5.45 |
| H-OIL PROCESS RESIDUE | $1.76 \times 10^7$ | $3.33 \times 10^8$ | 17.84 |
| ASPHALT 85/100 PEN | | | |
| 10% RESIDUE | $1.86 \times 10^7$ | $1.18 \times 10^8$ | 6.34 |
| 20% RESIDUE | $2.41 \times 10^7$ | $1.10 \times 10^8$ | 4.56 |
| 30% RESIDUE | $3.17 \times 10^7$ | $1.54 \times 10^8$ | 4.86 |
| ASPHALT 150/200 PEN | | | |
| 10% RESIDUE | $7.85 \times 10^6$ | $4.63 \times 10^7$ | 5.90 |
| 20% RESIDUE | $6.80 \times 10^6$ | $6.35 \times 10^7$ | 9.34 |
| 30% RESIDUE | $8.00 \times 10^6$ | $9.15 \times 10^7$ | 11.44 |
| ASPHALT 200/300 PEN | | | |
| 10% RESIDUE | $6.15 \times 10^6$ | $2.37 \times 10^7$ | 3.79 |
| 20% RESIDUE | $4.50 \times 10^6$ | $2.88 \times 10^7$ | 6.40 |
| 30% RESIDUE | $6.48 \times 10^6$ | $3.76 \times 10^7$ | 5.80 |

TABLE 8
PENETRATION AND RELATIVE DENSITY OF H-OIL RESIDUE/ASPHALT BLENDS USED FOR MARSHALL TESTING

| | ASPHALT 150/200 PEN | 97% ASPHALT BLEND 3% RESIDUE | 93% ASPHALT BLEND 7% RESIDUE | 90% ASPHALT BLEND 10% RESIDUE | 80% ASPHALT BLEND 20% RESIDUE | 70% ASPHALT BLEND 30% RESIDUE | H-OIL RESIDUE |
|---|---|---|---|---|---|---|---|
| PENETRATION AT 25° C. [$10^{-1}$mm] | 170 | 163 | 166 | 157 | 173 | 173 | 84 |
| RELATIVE DENSITY [kg m$^{-3}$] | 1030 | 1030 | 1030 | 1031 | 1031 | 1031 | 1045 |

TABLE 9
SOUTHERN ALBERTA AGGREGATE GRADATION

| SIEVE SIZE [mm] | % PASSING |
|---|---|
| 9.50 | 100.0 |
| 4.75 | 91.8 |
| 2.36 | 68.5 |
| 1.18 | 53.7 |
| 0.60 | 39.4 |
| 0.30 | 21.3 |
| 0.15 | 10.2 |
| 0.0075 | 7.0 |
| BULK RELATIVE DENSITY | 2.600 |
| WATER ABSORPTION [%] | 1.30 |

TABLE 11
GEORGIA GRANITIC GNEISS AGGREGATE GRADATON

| SIEVE SIZE [mm] | % PASSING |
|---|---|
| 12.50 | 100.0 |
| 9.50 | 95.0 |
| 4.75 | 70.0 |
| 2.36 | 50.0 |
| 1.18 | 41.4 |
| 0.60 | 31.2 |
| 0.30 | 20.8 |
| 0.15 | 12.6 |
| 0.075 | 7.0 |
| BULK RELATIVE DENSITY | 2.668 |
| WATER ABSORPTION [%] | 0.43 |

TABLE 10
MARSHALL STABILITY OF MIXES WITH H-OIL RESIDUE/ASPHALT BLENDS (SOUTHERN ALBERTA AGGREGATES)

| | BINDER CONTENT [% WT] | DENSITY [kg m$^{-3}$] | MARSHALL STABILITY [N] | MARSHALL STABILITY AFTER 24 HOUR SOAK [N] | RETAINED STABILITY [%] | FLOW [250 μm] | VMA [%] | AIR VOIDS [%] |
|---|---|---|---|---|---|---|---|---|
| ASPHALT | 7.5 | 2266 | 5242 | — | — | 10 | 19.4 | 4.7 |
| 150/200 PEN | 7.5 | 2270 | — | 4921 | 94 | 11 | 19.1 | 4.3 |
| 90% ASPHALT BLEND | 7.5 | 2306 | 7831 | — | — | 12 | 17.9 | 2.9 |
| 10% RESIDUE | 7.5 | 2306 | — | 7742 | 99 | 13 | 18.0 | 3.0 |
| 80% ASPHALT BLEND | 7.5 | 2292 | 7475 | — | — | 10 | 18.5 | 3.5 |
| 20% RESIDUE | 7.5 | 2298 | — | 7075 | 95 | 12 | 18.3 | 3.3 |
| 70% ASPHALT BLEND | 7.5 | 2292 | 7475 | — | — | 11 | 18.5 | 3.6 |
| 30% RESIDUE | 7.5 | 2293 | — | 7512 | 100 | 11 | 18.4 | 3.6 |

TABLE 12

MARSHALL STABILITY OF MIXES WITH H-OIL RESIDUE/ ASPHALT BLENDS (GEORGIA GRANITIC GNEISS AGGREGATE)

| | BINDER CONTENT [% WT] | DENSITY [kg m$^{-3}$] | MARSHALL STABILITY [N] | MARSHALL STABILITY AFTER 24 HOUR SOAK [N] | RETAINED STABILITY [%] | FLOW [250 μm] | VMA [%] | AIR VOIDS [%] |
|---|---|---|---|---|---|---|---|---|
| ASPHALT | 6.0 | 2356 | 10248 | — | | 9 | 15.9 | 2.8 |
| 150/200 PEN | 6.0 | 2356 | — | 1023 | 10 | 20 | 15.9 | 2.8 |
| 97% ASPHALT BLEND | 5.8 | 2355 | 10475 | — | | 8 | 15.9 | 3.2 |
| 3% RESIDUE | 5.8 | 2353 | — | 3146 | 30 | 16 | 15.8 | 3.2 |
| 93% ASPHALT BLEND | 5.8 | 2356 | 10297 | — | | 8 | 15.7 | 3.2 |
| 7% RESIDUE | 5.8 | 2356 | — | 3976 | 39 | 15 | 15.8 | 3.1 |
| 90% ASPHALT BLEND | 5.8 | 2352 | 10986 | — | | 8 | 15.9 | 3.2 |
| 10% RESIDUE | 5.8 | 2352 | — | 5931 | 54 | 11 | 15.9 | 3.3 |
| 80% ASPHALT BLEND | 5.8 | 2356 | 11253 | — | | 8 | 15.8 | 3.1 |
| 20% RESIDUE | 5.8 | 2355 | — | 5718 | 51 | 11 | 15.8 | 3.2 |
| 70% ASPHALT BLEND | 5.8 | 2352 | 10368 | — | | 8 | 15.9 | 3.3 |
| 30% RESIDUE | 5.8 | 2352 | — | 6430 | 62 | 12 | 16.0 | 3.4 |

We claim:

1. A novel asphaltic composition for use in road construction consisting of from about 2% to about 10% w/w of a hydrocracking residue and from about 98% to about 90% w/w of asphalt, said hydrocracking residue being the distillation residue obtained from a hydrocracking process of heavy crude oil and said asphalt being an asphalt with a penetration at 25° C. between 20 dmm and 600 dmm.

2. The asphaltic composition, as claimed in claim 1, wherein there is present from about 4% to about 8% w/w of hydrocracking residue and from about 96% to about 92% w/w of asphalt.

3. The asphaltic composition, as claimed in claim 1, wherein the asphalt has a penetration at 25° C. between 60 dmm and 400 dmm.

4. The asphaltic composition, as claimed in claim 1, wherein the heavy crude oil is a heavy crude oil originating from Alberta, Canada.

5. The asphaltic composition, as claimed in claim 1, wherein the asphalt is obtained by vacuum distillation of a crude oil.

6. The asphaltic composition, as claimed in claim 1, wherein the asphalt is obtained by oxidation of the residue of the vacuum distillation of a crude oil.

7. The asphaltic composition, as claimed in claim 1, wherein the asphalt is obtained by deasphalting of a petroleum fraction.

8. The asphaltic composition, as claimed in claim 1, wherein the asphalt is obtained by deasphalting of a petroleum fraction by propane deasphalting or butane deasphalting.

9. The asphaltic composition, as claimed in claim 1, wherein the hydrocracking residue is obtained from hydrocracking of heavy crude oil from Alberta, Canada and the asphalt has a penetration at 25° C. between 60 dmm and 400 dmm.

10. The asphaltic composition, as claimed in claim 1, wherein the hydrocracking residue is obtained from hydrocracking of heavy crude oil from Alberta, Canada and the asphalt has a penetration at 25° C. between 60 dmm and 400 dmm, said asphalt being obtained either by vacuum distillation of a crude oil, or by oxidation of the residue from the vacuum distillation of a crude oil, or by deasphalting of a petroleum fraction by propane deasphalting or butane deasphalting.

11. The asphaltic composition, as claimed in claim 2, wherein the hydrocracking residue is obtained from hydrocracking of heavy crude oil from Alberta, Canada and the asphalt has a penetration at 25° C. between 60 dmm and 400 dmm.

12. The asphaltic composition, as claimed in claim 2, wherein the hydrocracking residue is obtained from hydrocracking of heavy crude oil from Alberta, Canada and the asphalt has a penetration at 25° C. between 60 dmm and 400 dmm, said asphalt being obtained either by vacuum distillation of a crude oil, or by oxidation of the residue from the vacuum distillation of a crude oil, or by deasphalting of a petroleum fraction by propane deasphalting or butane deasphalting.

13. A road mix consisting of a novel asphaltic composition, as claimed in claim 1, in admixture with an appropriate mineral aggregate.

14. A road mix consisting of a novel asphaltic composition, as claimed in claim 1, in admixture with an appropriate mineral aggregate, said hydrocracking residue being obtained from hydrocracking of heavy crude oil from Alberta, Canada.

* * * * *

UNITED STATES PATENT AND TRADEMARK OFFICE
CERTIFICATE OF CORRECTION

PATENT NO.    : 4,904,305
DATED         : February 27, 1990
INVENTOR(S)   : Luda ZANZOTTO et al.

It is certified that error appears in the above-identified patent and that said Letters Patent is hereby corrected as shown below:

Table 9, column 1, change "0.0075"
and insert --0.075--.

Signed and Sealed this

Twenty-seventh Day of August, 1991

Attest:

HARRY F. MANBECK, JR.

Attesting Officer

Commissioner of Patents and Trademarks